United States Patent
Passerini et al.

(10) Patent No.: US 12,391,407 B2
(45) Date of Patent: Aug. 19, 2025

(54) APPARATUS FOR NON-DESTRUCTIVE INSPECTION OF STRUCTURAL ELEMENTS HAVING A WING PROFILE

(71) Applicant: WEMECH S.R.L., Besnate (IT)

(72) Inventors: Roberto Passerini, Besnate (IT); Paolo Castagnone, Besnate (IT); Davide Stefano Guerra, Besnate (IT); Fabrizio Severgnini, Besnate (IT); Elisa Mangano, Besnate (IT); Aida Muratov, Besnate (IT); Valeria Galli, Besnate (IT)

(73) Assignee: WEMECH S.R.L., Besnate (IT)

( * ) Notice: Subject to any disclaimer, the term of this patent is extended or adjusted under 35 U.S.C. 154(b) by 32 days.

(21) Appl. No.: 18/692,016

(22) PCT Filed: Sep. 13, 2022

(86) PCT No.: PCT/IB2022/058610
§ 371 (c)(1),
(2) Date: Mar. 14, 2024

(87) PCT Pub. No.: WO2023/042067
PCT Pub. Date: Mar. 23, 2023

(65) Prior Publication Data
US 2024/0375791 A1    Nov. 14, 2024

(30) Foreign Application Priority Data
Sep. 14, 2021 (IT) .................. 102021000023648

(51) Int. Cl.
*B64F 5/60* (2017.01)
*G01N 29/04* (2006.01)

(52) U.S. Cl.
CPC ............. *B64F 5/60* (2017.01); *G01N 29/045* (2013.01); *G01N 2291/2694* (2013.01)

(58) Field of Classification Search
CPC .. B64F 5/60; G01N 29/045; G01N 2291/2694
See application file for complete search history.

(56) References Cited

U.S. PATENT DOCUMENTS
5,521,957 A    5/1996    Hansen

FOREIGN PATENT DOCUMENTS
| EP | 2 345 881 A1 | 7/2011 |
| EP | 3 220 119 A1 | 9/2017 |
| JP | 6582344 B2 * | 10/2019 |

OTHER PUBLICATIONS

International Search Report and Written Opinion issued on Dec. 10, 2022, in corresponding International Application No. PCT/IB2022/058610, 11 pages.

* cited by examiner

*Primary Examiner* — Jason L Vaughan
*Assistant Examiner* — Amanda Kreiling
(74) *Attorney, Agent, or Firm* — Maier & Maier, PLLC

(57) ABSTRACT

An apparatus for non-destructive inspection of structural elements having a wing profile, including a base, a positioning module associated with the base in correspondence with its own first end portion and a detection module associated with a second end portion of the positioning module and including a support frame with at least one impulse hammer and at least one first microphone of the piezoelectric type are connected. The support frame includes at least a first arm with a first regulation unit is associated, adapted to support the impulse hammer and to regulate a movement along the first arm itself and a second arm to which a second regulation unit is associated, adapted to support the first microphone and to regulate a movement thereof along the second arm itself. The first arm and the second arm are arranged facing each other and spaced apart.

10 Claims, 3 Drawing Sheets

APPARATUS FOR NON-DESTRUCTIVE INSPECTION OF STRUCTURAL ELEMENTS HAVING A WING PROFILE

TECHNICAL FIELD

The present invention refers to the field of inspection systems of structural elements in the aerospace field. Specifically, the invention refers to an apparatus for non-destructive inspection of structural elements having a wing profile.

BACKGROUND

As is well known, in the field of inspection systems of structural elements in the aerospace field, such as rotorcraft blades or turboprop engine propellers, various investigation techniques are used to verify their integrity. Typically, the metal structures are inspected for assessing the presence of corrosion and/or cracks, while the elements made of composite material are generally analysed in order to verify the presence of structural damages or defects, both on the outer surface thereof and in their inside, due to, for example, phenomena of delamination, erosion, impact damages, infiltrations, cracks or other more.

In this context, various inspection techniques of the non-destructive type are known, through the emission of radiations (for example lasers or X-rays) or of ultrasounds, which allow an in-depth analysis of a structural element while keeping its structure intact.

Generally, more accurate analyses are also carried out in laboratories or rooms specifically dedicated to the inspection operations, leading to an increase in the time required to carry out the entire procedure as it is necessary to separate the structural elements to be examined from the main body of which they are a part and transport them to the place designated for the actual analysis. This inspection method imposes rather stringent limits as it is time-consuming and requires specialised staff.

An alternative method envisages carrying out the on-site inspection, by means of tests/analyses carried out manually by operators using appropriate devices which are moved along the body of the structural elements to be analysed; the quality of the inspection therefore depends on the ability and experience of the operator in managing the movement of the analysis device, as well as in interpreting the data collected. Therefore, the inspection operations carried out in this way require a long time to be carried out and are also subject to errors due to the subjectivity of the detection itself.

An alternative to these methods consists in using automated inspection devices, which generally include a structure that accommodates one or more sensors and, connected to the structural element to be analysed by means of rails or other appropriate connection means, is provided with an autonomous movement system along the profile of the element itself. This type of system can scan the structure of the element under examination, as well as process the data detected by the various sensors, however, it is an inflexible system in that the use of substantially rigid connecting means configured for a given wing profile (or airfoil), places a limitation on its movement along the profile of the structural element, as well as it can constitute an element of interference with the inspection area. Such systems are also not suitable in the contexts where the structural elements are positioned in partially accessible volumes or where they are characterised by a complex geometry. Finally, regardless of the means used for the movement and fixing to the profile of the structural element, these inspection systems weigh down on the element itself, resulting in stress states in the object under measurement that vary with the position of the measuring instrument, which can alter the measurement itself in a way that is difficult to predict, and therefore cannot be compensated for.

EP 2 345 881 describes an automated scanner for non-destructive inspection of aerospace structural elements. EP 3 220 119 describes a structured light measurement method for assessing an aerodynamic profile. U.S. Pat. No. 5,521,957 discloses an X-ray imaging system.

The need is therefore felt to have an apparatus for the inspection of structural elements having a wing profile, which allows for an efficient analysis of the wing profile itself.

An object of the present invention is to overcome the drawbacks of the prior art.

In particular, the object of the present invention is to provide an apparatus for non-destructive inspection of structural elements having a wing profile that is versatile, i.e. it can be used in various types of environments, as well as applicable to wing profiles also having complex geometry.

Another object of the present invention is to provide an apparatus for non-destructive inspection of structural elements capable of performing an analysis characterized by high precision and repeatability, while avoiding weighing down on the element under examination, so as to guarantee the integrity thereof.

Furthermore, the object of the present invention is to provide an apparatus for non-destructive inspection of structural elements having a limited weight and overall size, so as to be easily transportable among different environments, as well as portable on board an aircraft, such as for example a rotorcraft, which can therefore have it as equipment in order to provide appropriate on-site analysis if necessary.

A further object of the present invention is to provide an apparatus for non-destructive inspection of structural elements having a wing profile that allows optimizing the time for carrying out data collection and analysis operations.

Finally, the object of the present invention is to provide an apparatus for non-destructive inspection of structural elements having a wing profile, wherein the components constituting the structure thereof can be easily and quickly disassembled and/or assembled.

These and other objects of the present invention are achieved by an apparatus for non-destructive inspection of structural elements having a wing profile incorporating the features of the appended claims, which form an integral part of the present disclosure.

According to one aspect, the apparatus for non-destructive inspection of structural elements having a wing profile object of the present invention comprises a base, a positioning module associated with said base in correspondence with its own first end portion and a detection module associated with a second end portion of the positioning module, said detection module comprising a support frame to which at least one impulse hammer and at least one first microphone of the piezoelectric type are connected. The support frame comprises at least a first arm to which a first regulation unit is associated, adapted to support the impulse hammer and to regulate its movement along the first arm itself and a second arm to which a second regulation unit is associated, adapted to support the first microphone and to regulate its movement along the second arm itself. The first arm and the second arm are arranged facing each other and spaced apart, so as to define a working volume suitable for accommodating a structural element, said first arm and second arm being connected to each other by means of a connecting element which allows their reciprocal movement.

According to this solution, an apparatus is realized in a simple and economical way that allows to carry out an analysis—accurate and characterized by high repeatability—of the conditions of a structural element, in particular used in the aeronautical field and having a certain wing profile.

The present invention, in at least one of the aforesaid aspects, may have at least one of the following preferred features, taken individually or combined with any one of the other preferred features described.

In an embodiment, the connecting element consists of a connecting rod connected at its ends to the first arm and to the second arm, by respective joints, preferably revolute joints.

According to this configuration, an accurate positioning of the detection module with respect to the structural element being inspected can be realised easily and economically, and it is also possible to adapt the working volume to the particular shape of the wing profile, allowing to adapt the detection module to multiple types of structural elements, different in conformation and/or size.

Preferably, the detection module comprises at least a second microphone of the acoustic type, connected to the first arm of the support frame.

This makes it possible to precisely predict the spectrum of frequencies transmitted rigidly along the arm itself and thus to be able to purify them in a simple and highly effective way from the spectrum of frequencies being analysed.

Preferably, the apparatus comprises a programmable control unit, operatively associated at least with the base, the positioning module and the detection module, which is apt at least for the regulation of their activation and movement, as well as for the management of the inspection operations carried out through the apparatus itself.

Preferably, the apparatus comprises a stabilization device configured to connect in a removable manner the detection module with the structural element having a wing profile.

This advantageously makes it possible to reduce any movements of the structural element, such as oscillations and/or translations that may occur during inspection operations, making the measurement carried out by the apparatus on this element even more precise and reliable.

Preferably, the positioning module comprises one or more segments each other connected by means of motorized joints.

Preferably, the positioning module comprises an articulated arm, the base of which is associated with the base of the apparatus and its free end is associated with the detection module.

This configuration allows to have a highly versatile apparatus because, for the same size as with other types of moving modules, it allows to operate in a wide working field and therefore to reach the surfaces and the volume of structural elements that are variously oriented with respect to the working volume, as well as placed in areas that are difficult to access.

Preferably, the length of the first arm and of the second arm has a value greater than or equal to about 15 cm and less than or equal to about 100 cm.

This configuration makes it possible to provide for a compact sized detection module so as to be able to advantageously control its movement in the working space with high precision, in order to allow the use thereof in on-site investigation operations, even in working volumes that are difficult to reach or relative to complex-shaped wing profiles.

In one embodiment, an analysis module, suitable for processing the data detected by the detection module, is operationally associated with the apparatus itself.

Preferably, the base is provided with moving means.

According to a preferred embodiment, the stabilization device consists of a gripper configured to engage with the body of the structural element, preferably in an edge portion thereof, so as to stabilize the mutual position between the structural element and the detection module to which the stabilization device is integral.

In this way, a robust yet simple stabilization system is realised, which allows a temporary connection of the detection module to the structural element to be provided quickly and easily.

According to an alternative preferred embodiment, the stabilization device consists of one or more suction cups, configured to engage with a surface of the structural element, so as to stabilize the mutual position between the structural element and the detection module to which the stabilization device is integral.

Further features and advantages of the present invention will be more evident from the description of the accompanying drawings.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate. Moreover, for clarity of illustration, certain references may not be repeated in all drawings.

DETAILED DESCRIPTION OF THE EMBODIMENTS

Figure 1:
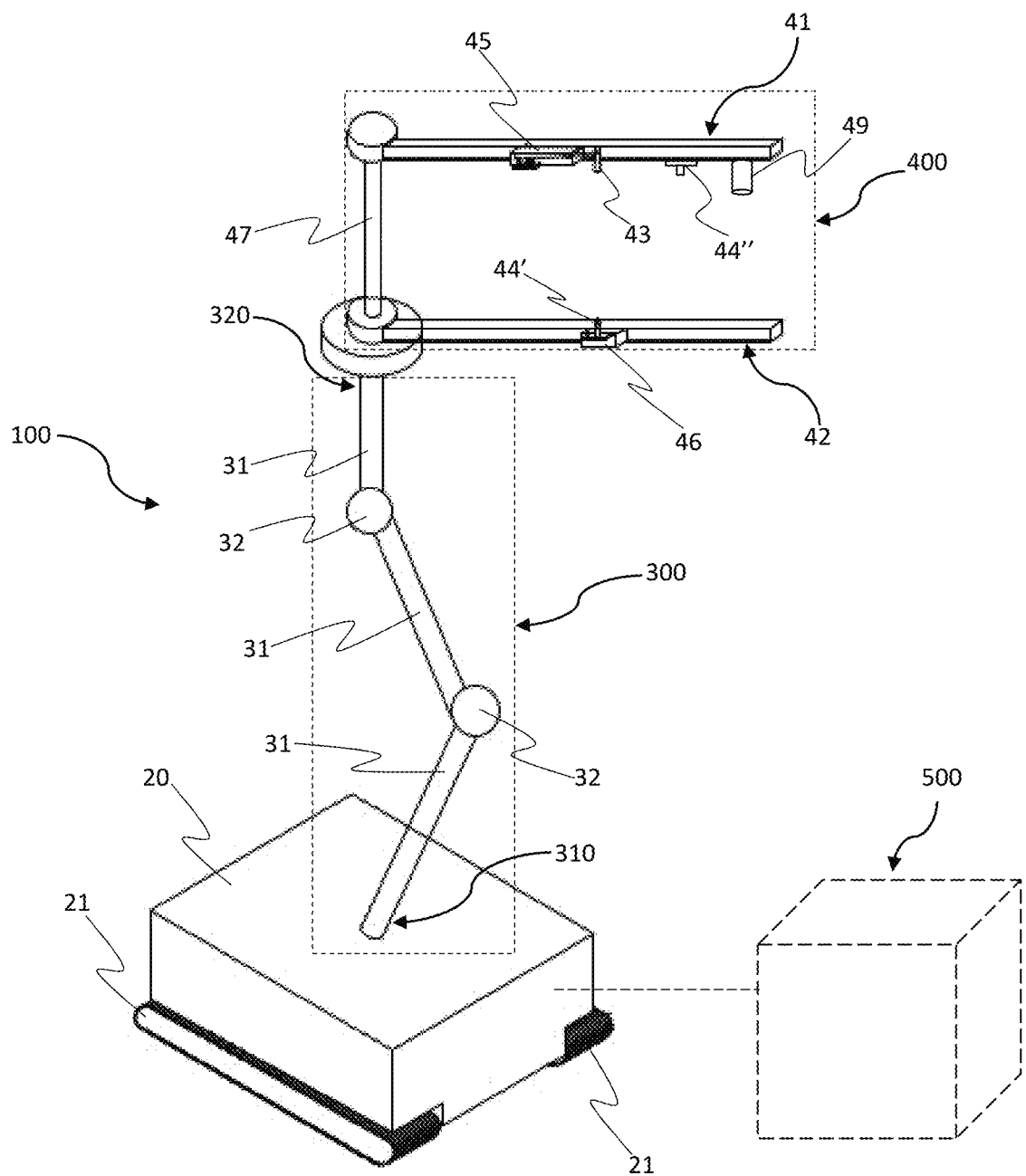
FIG. 1 is a schematic perspective view of an apparatus for non-destructive inspection of structural elements having a wing profile, according to an embodiment of the present invention.

While the invention is susceptible to various modifications and alternative constructions, certain preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "includes" means "includes, but not limited to" unless otherwise indicated.

With reference to FIG. 1, an apparatus 100 for the non-destructive analysis of structural elements 10 having a wing profile, according to a preferred embodiment of the invention is described.

The apparatus 100 comprises a base 20 to which a positioning module 300 extending therefrom is associated; in particular, the positioning module 300 is associated with the base 20 in correspondence with its own first end portion 310 by means of connecting means (not shown in the figures) preferably consisting of a revolute joint.

The apparatus 100 further comprises a detection module 400 associated with a second end portion 320 of the positioning module 300, and configured to receive the equipment suitable for detecting the data necessary in the execution of an inspection operation of a structural element 10 having a wing profile.

Figure 3A:
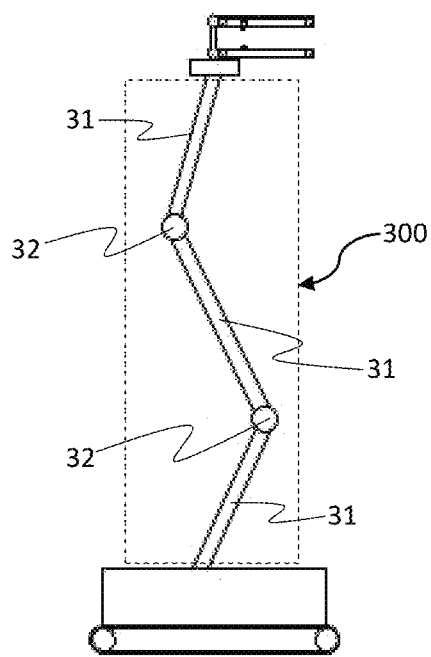
FIG. 3a is a schematic side view of the apparatus of FIG. 1.
Figure 3B:
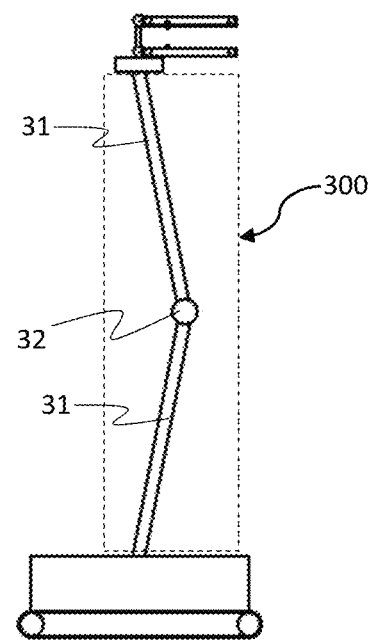
FIG. 3b is a schematic side view of the apparatus of FIG. 1 in a first alternative embodiment.
Figure 3C:
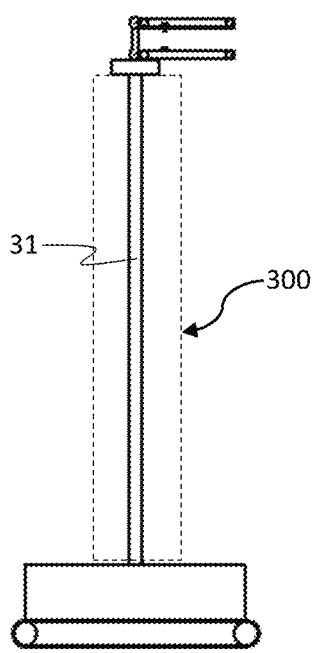
FIG. 3c is a schematic side view of the apparatus of FIG. 1 in a second alternative embodiment.

According to the invention, the positioning module 300 may comprise one or more segments 31, in particular, according to a preferred configuration that envisages using a single segment 31, the end portions of such segment coincide with the first end portion 310 and with the second end portion 320 of the positioning module 300, like for example shown in FIG. 3c. According to alternative embodiments of the apparatus 100, the positioning module 300 comprises two segments 31 (FIG. 3b) or three segments 31 (FIGS. 1 and 3a), in both cases connected to each other by joints 32, preferably motorized joints.

Preferably, the positioning module 300 comprises an articulated arm (i.e. 6-axis anthropomorphic robot), the base of which is associated with the base 20 of the apparatus 100 and the free end thereof is associated with the detection module 400. In this way, it is possible to accurately and reliably orient the detection module 400 in a working space and ensure the precision of the inspection operations relative to structural elements 10 of various shapes and sizes; this configuration also allows to have a highly versatile apparatus 100 since, for the same size as with other types of moving modules, it allows to operate in a wide working field and therefore to reach (and therefore inspect) the surfaces and the volume of structural elements 10 that are variously oriented with respect to the working volume, as well as placed in areas that are difficult to access, while keeping the element 10 on the body of the aircraft to which it is associated, allowing a considerable saving in terms of time spent and therefore of the costs incurred for carrying out the inspection operations.

Regardless of the preferred embodiment chosen on the basis of the specific requirements given by the type of structural element 20 to be inspected as well as its positioning in the space that accommodates it, the positioning module 300 is configured to reach an extension up to a maximum height of approximately 6 m from the ground on which the base 20 is positioned.

In a preferred embodiment, the base 20 is provided with moving means 21 that may preferably consist of tracks (as shown in FIG. 1), so as to ensure a precise and reliable movement of the apparatus 100 in any direction and on any type of surface or ground, even uneven one. In an alternative embodiment (not shown in the figures), the moving means 21 consist of wheels; this solution is particularly advantageous if the investigation operations are carried out in environments with substantially homogenous terrain, as they constitute a less costly alternative with respect to the solution involving the use of tracks, and at the same time allows for a high precision in the movement and in positioning the base 20 with respect to the body of the structural element 10 under examination.

The detection module 400 further comprises a support frame configured to accommodate at least one impulse hammer 43 and at least one first microphone 44' of the piezoelectric type. More in detail, the support frame comprises at least a first arm 41 to which a first regulation unit 45 is associated, adapted to support the impulse hammer 43 and to regulate its movement along the first arm 41 itself; the support frame further comprises a second arm 42, to which a second regulation unit 46 is associated, adapted to support the first microphone 44' of the piezoelectric type and to regulate its movement along the second arm 42 itself.

The impulse hammer 43 is connected to a load cell adapted to measure the force applied to the structural element 10 during the actuation of the hammer 43 itself. This makes it possible to stress the structure of the structural element 10 through the application of an impulsive force, such a mode being particularly convenient for the non-invasive investigation of relatively light structures; the use of a limited weight investigation device such as the aforementioned impulse hammer 43, also makes it possible to realize a light inspection apparatus and at the same time able to provide reliable and repeatable measurements being such a device regulated in an automated manner.

According to a preferred embodiment of the invention, the first regulation unit 45 and the second regulation unit 46 advantageously consist of carriages (not shown in the figures), actuated by means of suitable servomechanisms which are advantageously also automated by means of partially autonomous positioning technologies also having recourse to machine learning principles, and configured to support at least the impulse hammer 43 and at least the first microphone 44' of the piezoelectric type; said carriages are accommodated in appropriate seats (not shown in the figures) obtained substantially along the entire extension respectively of the first arm 41 and of the second arm 42, within which they can slide and therefore translate along the first and second arm 41, 42. According to this solution it is advantageously possible to position in an automated manner the equipment suitable for data collection, specifically the impulse hammer 43 and the first microphone 44', so as to obtain an accurate and repeatable measurement substantially at each point of the structural element 10 being inspected.

According to a further embodiment, the first regulation unit 45 and the second regulation unit 46 consist of joints having planar or three-dimensional action (ball joints), which can also be locked by the operator to allow predetermined exploration actions of specific areas of the measuring object.

According to the invention, the first arm 41 and the second arm 42 are configured to be arranged facing each other and spaced apart, at each step of the inspection process, so as to define a working volume adapted to accommodate the structural element 10 to be subjected to inspection. The first arm 41 and the second arm 42 are further connected to each other by means of a connecting element 47 which allows their reciprocal movement.

According to a preferred embodiment, as shown for example in FIG. 1, the connecting element 47 consists of a connecting rod connected to the first arm 41 and to the second arm 42 at their own ends, through respective joints, preferably revolute joints, which allow the relative movement of each portion of the frame both with respect to the connecting rod and with respect to the structural element 10 subjected to analysis. Preferably the connecting element 47 is connected to the second end portion 320 of the positioning module 300 by means of a revolute joint. According to a further preferred embodiment, the connecting element 47 is connected to the second end portion 320 of the positioning module so as to offer a unilateral rather than bilateral degree of freedom, to the advantage of the rigidity, the precision and the safety of the system.

According to these configurations it is possible to achieve, in a simple and economical way, an accurate positioning of the first and of the second arm 41, 42 of the frame with respect to the structural element 10 subjected to inspection, by adapting the working volume to the conformation of the element 10 itself and therefore making it possible to adapt the apparatus 100 to multiple types of wing profiles, different in conformation and sizes.

Preferably, the connecting rod has a length whose value is greater than or equal to about 10 cm and less than or equal to about 40 cm, preferably greater than or equal to about 15 cm and less than or equal to about 25 cm.

According to a preferred embodiment of the apparatus 100 according to the invention, the length of the first arm 41 has a value greater than or equal to about 15 cm and less than or equal to about 100 cm, preferably greater than or equal to about 25 cm and less than or equal to about 70 cm. Preferably, the length of the second arm 42 has a value greater than or equal to about 15 cm and less than or equal to about 100 cm, preferably greater than or equal to about 25 cm and less than or equal to about 70 cm. Preferably, the length of the first arm 41 is substantially similar to the length of the second arm 41. According to this configuration, the frame of the detection module 400 is provided with a substantially symmetrical, modular and repeatable structure for the whole benefit of the positioning control precision, standardization, production quality and economies of scale.

Figure 2A:
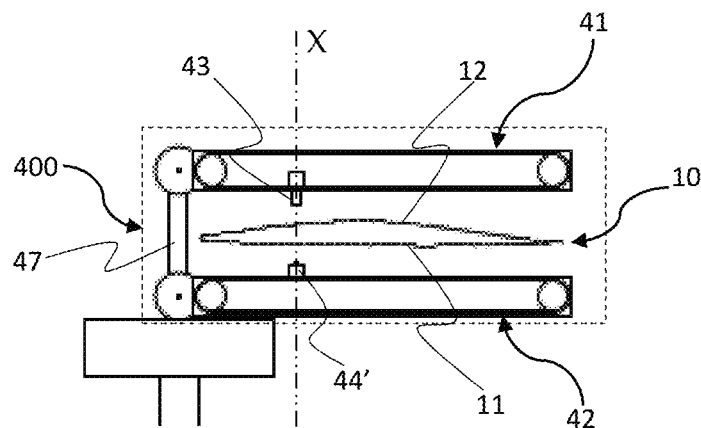
FIG. 2a is a schematic perspective view of a detail of the apparatus of FIG. 1, in an operational configuration, in which a structural element having a wing profile is visible, which is located in a working space defined by elements of the apparatus itself.
Figure 2B:
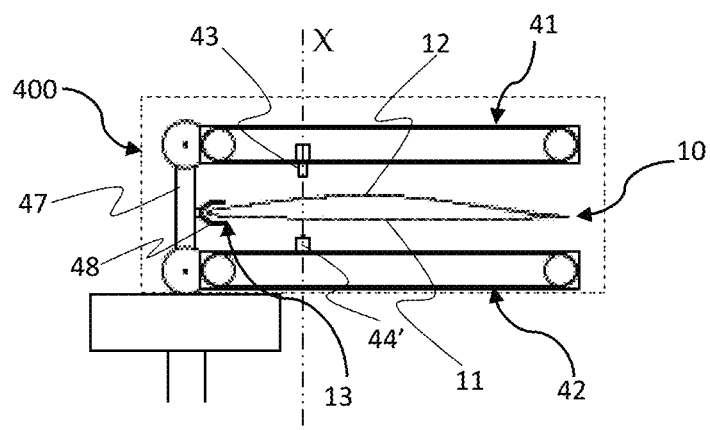
FIG. 2b is a schematic perspective view of the detail of FIG. 2a, according to a first alternative embodiment.

Preferably, the apparatus 100 comprises a stabilization device 48 configured to connect in a removable manner the detection module 400 with the structural element 10. More in detail, said stabilization device 48 is connected to the connecting element 47 and projects therefrom towards the working volume defined between the first arm 41 and the second arm 42 of the support frame, so as to engage with the body of the structural element 10 during the inspection steps thereof. According to an embodiment, as shown for example in FIG. 2b, the stabilization device 48 consists of a gripper configured to temporarily engage with the body of the structural element 10, preferably in an edge portion 13 thereof, so as to stabilize the mutual position between the structural element 10 and the detection module 400 to which the stabilization device is integral, during the measurement operations. In particular, the jaws of said gripper can be made of partially yielding material or with its own internal structure suitable to conform adequately to the wing profile of the structural element 10 to which they are associated and at the same time to avoid damaging the same.

Figure 2C:
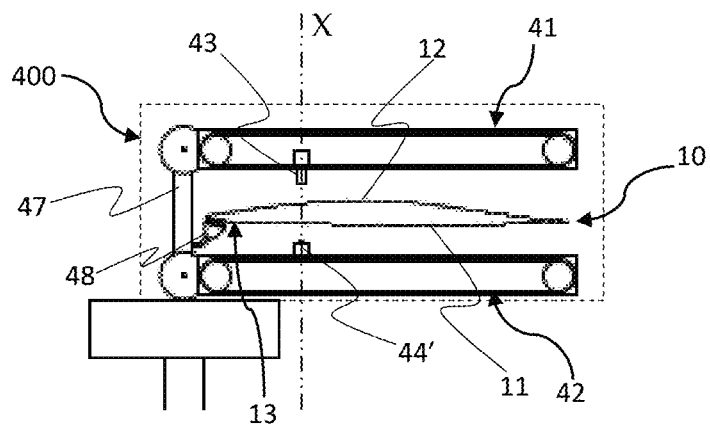
FIG. 2c is a schematic perspective view of the detail of FIG. 2a, according to a second alternative embodiment.

According to an alternative embodiment, as shown for example in FIG. 2c, the stabilization device 48 consists of one or more suction cups configured to engage with the surface of the structural element 10 which is in the working volume defined above, so as to stabilize the mutual position between the structural element 10 and the detection module 400 to which the stabilization device is integral.

According to a preferred configuration, the apparatus 100 may further comprise one or more second microphones 44" of the acoustic type, preferably arranged in connection with the first arm 41 of the support frame with the advantage of being able to precisely predict the spectrum of frequencies transmitted rigidly along the arm itself and therefore to be able to purify them in a simple and very effective way from the spectrum of frequencies under analysis.

According to a preferred configuration, the apparatus 100 comprises at least one camera 49, preferably of the high-definition type, associated with the first arm 41 and/or with the second arm 42 of the support frame. In this way it is advantageously possible to have a further investigation device that allows a preliminary visual examination of the surface of the structural element 10 to detect the presence of any defects.

The apparatus 100 according to the invention is preferably provided with a programmable control unit (not shown in the figures), operatively associated at least with the base 20, the positioning module 300 and the detection module 400, which is apt for the activation of the elements that constitute these components as well as for the control of their movement, that is for the management of the inspection operations carried out by the apparatus 100 itself.

The apparatus 100 is also operationally associated with an analysis module 500 adapted to process the data detected by the detection module. In particular, said analysis module 500 comprises hardware and software intended for the analogue/digital conversion of the signals, raw data signal storage units, processing software by de-convolution by reverse Fourier analysis of the collected spectra, I/O ports for the input and output of data, backup power systems to guarantee the conservation and integrity of the data and possible encryption software for special applications with high sensitivity of the information collected and processed.

According to a preferred embodiment, the analysis module 500 is arranged externally in a special chassis with protection class suitable for the expected environmental conditions of use.

Thanks to the modularity of the devices that make it up, the apparatus 100 according to the present invention can be easily composed and subsequently decomposed in situ, and can also be configured based on the specific applications for which it is intended to be used such as, for example, main rotor blades or helicopter tail blades, turboprop engine blades or also other types of structural elements 10 having a wing profile.

The sizes and the weight of the elements and of the modules constituting the apparatus 100, in addition to the aforementioned modularity characteristics, make it possible to realize an apparatus for non-destructive investigation that is easily transportable, also advantageously envisaging placing the components in a transportable container. According to the preferred configuration of the invention described above, the apparatus 100 can in fact be decomposed into a plurality of parts that can be contained and transported in a container whose sizes are preferably about 80×100×60 and whose weight is less than or equal to about 60 kg.

With particular regard to the operation of the apparatus 100, in an initial preparation step, the structural element 10 is preferably constrained to the ground by means of a simple support (not shown in the figures) placed in connection with one end thereof, so as to improve its stability and avoid any undesired rotations or movements during the inspection operations; preferably such support consists of a set of levers, free to rotate around a pivotal point, which guarantee stabilization by resting their free ends on the ground and being constrained in this position by means of conventional clamps applied to the joints. An abutment element (not shown in the figures), consisting for example of a small reflective panel, is also positioned at one end of the structural element 10 to define a reference point for the measurements to be made during the inspection; in a preferred configuration the abutment element coincides with the support adapted to constrain the structural element 10 to the ground.

Following such preferred preparatory steps, if any, the apparatus 100 is connected to a power grid or to a generator, and the apparatus 100 is positioned with respect to the structural element 10 to be subjected to inspection. For this purpose, the positioning module 300 is actuated and the detection module 400 is suitably positioned with respect to the wing profile of the structural element 10; this step can be carried out manually by an operator or managed remotely (for example through a remote control), or by activating the programmable control unit which, as mentioned, can be arranged for controlling the base 20, the positioning module 300 and the detection module 400.

Following this positioning, the stabilization device 48, if present, can be activated (manually or by means of the programmable control unit). Once the mutual position of the detection module 400 and the structural element 10 has been stabilized, the inspection system consisting of at least the impulse hammer 43 and the relative first microphone 44' is activated; in particular, the first microphone 44' is placed in contact with a rear surface 11 of the structural element 10 and at the reciprocal position assumed by the impulse hammer 43 on a front surface 12 of the structural element 10, that is, so that the first microphone 44' is placed at a vertical axis X passing through the point of contact between the impulse hammer 43 and the front surface 12 of the structural element, that is, at the point where the mechanical stress is imposed on the element 10 (as shown for example in FIGS. 2a-2c).

Following this positioning, a signal is sent to the impulse hammer 43, following which the hammer imparts a mechanical stress on the front surface 12; the sound wave thus produced is then detected by the first microphone 44' and by the second microphone 44", if present.

At the end of this operation, the stabilization device 48 that may be present is unlocked, and the positioning module 300 activated so as to displace the detection module 400 to a different position, to carry out a new scan. Any overlaps of the areas measured in two successive scans are managed through a dedicated software system of the analysis unit.

According to the configuration that provides for the positioning module to comprise an articulated arm, it is advantageously possible to optimize the positioning of the detection module 400 relative to the structural element 10, allowing to perform scans at two or three different pivot points without the need to reposition the base 20. Once the maximum extension limit of the positioning module 300 has been reached, the detection module 400 is repositioned at a safe distance and the movement of the base 20 is again activated, so as to move to a new distance from the element 10 that allows a new investigation cycle to be completed on a new portion of the wing profile of the structural element 10.

The data collected during the subsequent investigation steps, i.e. at least the characteristics of the sound wave that is generated in the propagation through the body of the structural element 10 produced as a result of the stress implemented through the impulse hammer 43, are collected by the analysis unit (by wiring or wireless system including Bluetooth and/or Wi-Fi technologies, or even infrareds if required by the environmental scenario of the detection operations) which is able to transform the different signals into three-dimensional images. Preferably, the images thus recreated refer to the reference point defined on a major axis of the structural element 10, while the minor axis is defined by the pivot point of the rotation of the detection module 400; in this way each individual reconstructed image is referred to such a reference point of the blade. The set of images thus produced can thus be analysed by an operator for the assessment of the physical-structural conditions of the element 10.

The invention thus conceived is susceptible to several modifications and variations, all falling within the scope of the inventive concept.

For example, the apparatus 100 comprises one or more proximity sensors, for example of the optical type (not shown in the figures), capable of detecting the position of the positioning module 300 with respect to the body of the structural element 10 to be subjected to inspection; in this way it is possible to control the approach and positioning movement of the positioning module 330 with respect to the element 10 in an extremely accurate manner. In addition, a series of joints and controlled axles on the top of the arm are able to reduce the inevitable parasitic movements of the articulated arm.

In addition, it is possible to envisage the use of further devices suitable for data detection, in addition to the equipment provided in the embodiments described above, such as, for example, generators and respective detectors of soft or hard X-rays and/or Gamma rays, or generators and respective detectors of ultrasounds or other additional types of investigation systems.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. An apparatus for non-destructive inspection of structural elements having a wing profile, the apparatus comprising:
    a base;
    a positioning module associated with the base in correspondence with its own first end portion;
    a detection module associated with a second end portion of the positioning module and comprising a support frame to which at least one impulse hammer and at least one first microphone of piezoelectric type are connected;
    wherein the support frame comprises at least a first arm to which a first regulation unit is associated, adapted to support the impulse hammer and to regulate a movement of the hammer along the first arm itself and a second arm to which a second regulation unit is associated, adapted to support the first microphone and to regulate a movement of the microphone along the second arm itself; and wherein
    said first arm and said second arm are arranged facing each other and spaced apart, so as to define a working volume suitable for accommodating the structural elements having the wing profile, said first arm and said second arm connected to each other by a connecting element which allows their reciprocal movement.

2. The apparatus according to claim 1, wherein the connecting element comprises a connecting rod connected at its ends to the first arm and to the second arm by respective joints.

3. The apparatus according to claim 1, wherein the detection module comprises at least a second microphone of the acoustic type, connected to the first arm of the support frame.

4. The apparatus according to claim 1, further comprising a programmable control unit operatively associated at least with the base, the positioning module, and the detection module, which is apt at least for regulation of their activation and movement, as well as for management of the inspection operations carried out through the apparatus itself.

5. The apparatus according to claim 1, further comprising a stabilization device configured to connect, in a removable manner, the detection module with the structural element having the wing profile.

6. The apparatus according to claim 5, wherein the stabilization device comprises a gripper configured to engage with a body of the structural element so as to stabilize a mutual position between the structural element and the detection module to which the stabilization device is integral.

7. The apparatus according to claim 1, wherein the positioning module comprises one or more segments each other connected by means of motorized joints.

8. The apparatus according to claim 1, wherein a length of the first arm and of the second arm has a value greater than or equal to about 15 cm and less than or equal to about 100 cm.

9. The apparatus according to claim 1, wherein an analysis module configured for processing data detected by the detection module is operationally associated with the apparatus itself.

10. The apparatus according to claim 1, wherein the base is provided with moving means.

* * * * *